(12) United States Patent
Westberg et al.

(10) Patent No.: US 9,521,615 B2
(45) Date of Patent: Dec. 13, 2016

(54) TRANSPORT NETWORK RELAYING IN ENERGY EFFICIENT NETWORKS

(75) Inventors: Lars Westberg, Enköping (SE); Ralf Bergqvist, Bromma (SE); Erik Friman, Stockholm (SE); Johan Rune, Lidingö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 89 days.

(21) Appl. No.: 14/412,622

(22) PCT Filed: Jul. 3, 2012

(86) PCT No.: PCT/SE2012/050770
§ 371 (c)(1),
(2), (4) Date: Jan. 2, 2015

(87) PCT Pub. No.: WO2014/007693
PCT Pub. Date: Jan. 9, 2014

(65) Prior Publication Data
US 2015/0189588 A1    Jul. 2, 2015

(51) Int. Cl.
*H04W 28/02* (2009.01)
*H04W 52/02* (2009.01)
*H04W 88/08* (2009.01)

(52) U.S. Cl.
CPC ..... *H04W 52/0206* (2013.01); *H04W 28/0221* (2013.01); *H04W 88/08* (2013.01); *Y02B 60/50* (2013.01)

(58) Field of Classification Search
None
See application file for complete search history.

(56) References Cited

U.S. PATENT DOCUMENTS

| 5,317,198 A | * | 5/1994 | Husbands | H04L 12/423 |
| | | | | 250/227.11 |
| 6,359,871 B1 | | 3/2002 | Chung et al. | |
| 9,265,073 B2 | * | 2/2016 | Powell | H04W 76/02 |

(Continued)

FOREIGN PATENT DOCUMENTS

| CN | 1518373 A | 8/2004 |
| EP | 2408227 A1 | 1/2012 |

OTHER PUBLICATIONS

Office Action in EP application No. 12880560.3 mailed Jun. 19, 2015.

(Continued)

*Primary Examiner* — Chi H Pham
*Assistant Examiner* — Shick Hom
(74) *Attorney, Agent, or Firm* — Patent Portfolio Builders, PLLC

(57) ABSTRACT

A method in a first network node (215) for handling transport network data traffic in a first base station (201) is provided. The first base station (201) comprises a transport network transmission equipment (205) and the transport network transmission equipment (205) is a part of a transport network. When the first base station (201) is in a sleep mode, the first network node (215) determines (306, 801) that the transport network transmission equipment (205) should be bypassed by activating a relay (209) comprised in the first base station (201) such that data traffic from a second network node (217) is transmitted via the relay (209) to a third network node (220).

18 Claims, 9 Drawing Sheets

(56) References Cited

U.S. PATENT DOCUMENTS

| | | | |
|---|---|---|---|
| 2003/0216141 A1 | 11/2003 | Antoniou et al. | |
| 2006/0115268 A1* | 6/2006 | Zirnheld | H04B 10/038 398/59 |
| 2007/0041358 A1* | 2/2007 | Cook | H04M 19/08 370/352 |
| 2008/0292095 A1* | 11/2008 | Vig | H04B 10/70 380/2 |

OTHER PUBLICATIONS

Feng, Michael Z. et al., "Energy Efficiency in Optical IP Networks with Multi-Layer Switching", Optical Society of America, Mar. 6, 2011, 1-3.

* cited by examiner

TRANSPORT NETWORK RELAYING IN ENERGY EFFICIENT NETWORKS

TECHNICAL FIELD

Embodiments herein relate generally to a first network node and a method in the first network node. More particularly the embodiments herein relate to handling transport network data traffic in a first base station.

BACKGROUND

In a typical communications network, also referred to as a wireless communication network, communication system or wireless communication system, a User Equipment (UE), communicate via a Radio Access Network (RAN) to one or more Core Networks (CNs).

A user equipment is a device by which a subscriber may access services offered by an operators network and services outside operator's network to which the operators radio access network and core network provide access, e.g. access to the Internet. The user equipment may be any device, mobile or stationary, enabled to communicate over a radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or Personal Computer (PC). The user equipment may be portable, pocket storable, hand held, computer comprised, or vehicle mounted devices, enabled to communicate voice and/or data, via the radio access network, with another entity, such as another user equipment or a server.

User equipments are enabled to communicate wirelessly with the network. The communication may be performed e.g. between two user equipments, between a user equipment and a regular telephone and/or between the user equipment and a server via or comprised in the radio access network and possibly one or more core networks and possibly the Internet.

The radio access network covers a geographical area which is divided into cell areas, with each cell area being served by a Base Station (BS), e.g. a Radio Base Station (RBS), which in some radio access networks is also called evolved NodeB (eNB), NodeB, B node or base station. A cell is a geographical area where radio coverage is provided by the base station at a base station site. Thus, the communications network may also be referred to as a cellular network. The base stations communicate over the air interface operating with the user equipments within range of the base stations. The base station will be referred to as BS in some of the drawings.

A network deployment strategy which is more or less generally assumed to be dominant in future cellular networks is the so called heterogeneous networks. In a heterogeneous network large and small cells, high power and low power base stations/access points are mixed with each other in a largely overlapping fashion. Different cells may also employ different Radio Access Technologies (RATs), such as LTE FDD and LTE TDD, other RATs of the Third Generation Partnership Project (3GPP) family. Other RATS of the 3GPP family may be the Universal Mobile Telecommunications System (UMTS)/High Speed Packet Access (HSPA) and/or Global System for Mobile communication (GSM)/General packet radio service (GPRS)/Enhanced Data rates for GSM Evolution (EDGE), and non-3GPP RATs, e.g. IEEE 802.11x family (where "x" may be e.g. "a", "b", "g" or "n") RATs or 3GPP2 RATs, e.g. Code division multiple access 2000 (CDMA2000). LTE is short for Long Term Evolution, FDD is short for Frequency Division Duplexing and TDD is short for Time Division Duplexing. IEEE is short for Institute of Electrical and Electronics Engineers. Other concepts that may be utilized to create the heterogeneous environment include e.g. Remote Radio Units (RRUs) and so called "baseband hotels", where multiple baseband processing units are located at a semi central site. In a heterogeneous network the same location is often covered (i.e. within the radio transmission and reception coverage area) by more than one cell and base station or access point. Pico cells are often deployed to provide greater capacity in hotspot areas with dense user population and intense wireless communication, while macro cells provide the overall wide area coverage. Pico and femto cells, as well as RRUs may also be deployed to improve coverage in locations which are poorly covered by the macro cell layer, e.g. indoors.

Another topic that currently receives a lot of attention in the communications network industry is the importance of energy efficiency, both for the purpose of reducing OPerational EXpenses (OPEX) and in order to save the environment by reducing the $CO_2$ footprint of communications networks. Another motive is to create goodwill for the operators and for the industry as a whole.

Combining heterogeneous networks and energy efficiency provides opportunities to leverage the greater number of base stations and the layered cell architecture of heterogeneous networks which often have overlapping coverage areas. To this end, schemes have been proposed where some cells of one layer, e.g. pico cells, are powered down (put in sleep mode) when the data traffic load and resource demands are low enough for the macro layer to handle. This principle may be used even in a non overlapping scenario, where instead the coverage areas of neighboring cells are extended, either by tilting up the antennas or utilizing reconfigurable antenna system techniques or adaptive antenna mechanisms, so that they cover the area of a cell that is currently in sleep mode.

Sleep mode may be utilized on various time scales and various levels in terms of affected hardware. The sleep mode may affect the entire base station, the part of the base station responsible for a certain cell, the transmission equipment, including a Power Amplifier (PA), or single circuit boards or components being part of pooled equipment or components. The time scale may be hours, e.g. shutting down an entire base station during nighttime, all the way down to milliseconds, e.g. putting single components, or even the PA, into sleep mode on an LTE subframe basis.

Such energy saving sleep mode strategies may be utilized even in deployments where the coverage is not taken over by a higher layer or neighboring cells. Potential scenarios may be low load periods (even empty cells which are not uncommon) or in combination with controlled Discontinuous Transmission (DTX) strategies where the users equipment(s) in the cell know when to expect and when not to expect transmissions, such as reference signals and system information, from the base station. On demand wakeup of sleeping cells to be ready to receive user equipments handed over from neighbor cells is another mechanism that may be used in conjunction with energy saving based on sleep mode.

A problem with the state of the art energy saving techniques in heterogeneous networks is that base stations often have embedded transport network transmission equipment, e.g. in the form of routers, switches (e.g. Ethernet switches) or SDH/PDH equipment, so that the connectivity of one base station depends on the transport network transmission equipment of another base station. SDH is short for Synchronous Digital Hierarchy and PDH is short for Plesiochronous Digital Hierarchy. An example is the commonly used tree deployment, wherein each branch comprises a number of cascaded base stations that depend on each other, as illustrated in FIG. 1. The right branch in FIG. 1 comprises four base stations A, B, C and D. The left branch in FIG. 1 comprises three base stations E, F and G. The gateway, referred to with GW in FIG. 1, is a switch or a router that concentrates the traffic to a link northbound from both branches. The fact that the connectivity of one base station depend on the transport network transmission equipment in one or more other base stations interfere with the sleep mode strategy, because the entire base station cannot be put in sleep mode even when all its cells are shut down, because the embedded transport network transmission equipment has to be active to provide connectivity to other base stations, e.g. the base stations further out on the same branch in a tree deployment (unless there are no active base stations further out on the branch). For example, base station B in the right branch in FIG. 1 cannot be put in complete sleep mode, unless base station C and D are also sleeping. The embedded transport network transmission equipment may represent a non negligible part of the energy consumption of a base station and thus represents a significant energy saving potential which unfortunately cannot be realized in many deployments.

SUMMARY

An object of embodiments herein is therefore to obviate at least one of the above problems and disadvantages and to provide improved energy saving in communications networks.

According to a first aspect, the object is achieved by a method in a first network node for handling transport network data traffic in a first base station. The first base station comprises a transport network transmission equipment and the transport network transmission equipment is a part of the transport network. When the first base station is in a sleep mode, the first network node determines that the transport network transmission equipment should be bypassed by activating a relay comprised in the first base station, such that data traffic from a second network node is transmitted via the relay to a third network node.

According to a second aspect, the object is achieved by a first network node for handling transport network data traffic in a first base station. The first base station comprises a transport network transmission equipment and the transport network transmission equipment is a part of the transport network. The first network node comprises a processor configured to, when the first base station is in a sleep mode, determine that the transport network transmission equipment should be bypassed by activating a relay comprised in the first base station such that data traffic from a second network node is transmitted via the relay to a third network node.

Embodiments herein afford many advantages, of which a non exhaustive list of examples follows:

An advantage of the embodiments herein is that they enable sleeping base stations to turn off all or parts of their transport network transmission equipment without affecting dependent base stations. Thereby the energy saving mechanisms in communications networks is improved, especially in heterogeneous network scenarios. It is especially improved in heterogeneous network scenarios because it is easier to go from a capacity dimensioned network (with small nodes activated) to a coverage dimensioned network relying on only the macro node.

Another advantage is that, without the embodiments herein, the energy efficiency functionality with cells and nodes in sleep modes cannot be utilized.

The embodiments herein are applicable to more or less any communications system, such as the 3GPP and 3GPP2 system families.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

The embodiments herein leverage and extend a relay mechanism for disconnecting a sleeping base station from the transport network and bypassing the connectivity to other network nodes or base stations. The relay mechanism is extended with a control architecture that allows another network node to coordinate the relay operation (i.e. the closing and opening of the relay) with the sleep mode operation of base stations, thereby allowing the sleeping base stations to turn off all, or parts of their transport network transmission equipment without affecting dependent base stations. Through this the energy saving mechanisms in cellular networks may be improved, especially in heterogeneous network scenarios.

Figure 2:
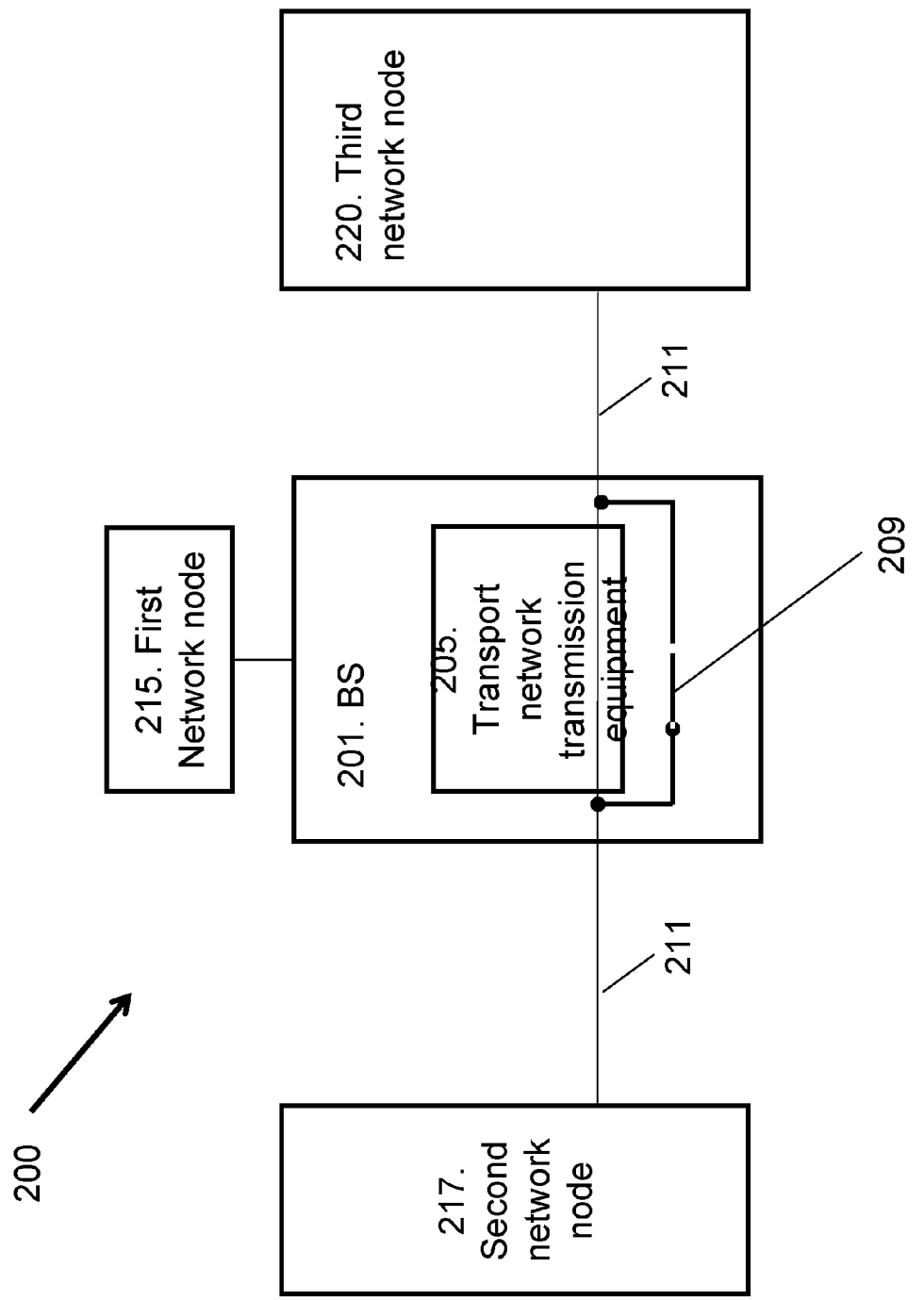
FIG. 2 is a schematic block diagram illustrating embodiments of a communications network.

FIG. 2 depicts a communications network 200 in which embodiments herein may be implemented for transport network relaying in energy efficient communications networks. The communications network 200 may in some embodiments apply to one or more radio access technologies such as for example LTE, LTE Advanced, Wideband Code Division Multiple Access (WCDMA), GSM, CDMA2000, CDMA2000 1×EV-DO, or any other 3GPP or 3GPP2 radio access technology, or other radio access technologies such as for example Wireless Local Area Network (WLAN). EV-DO is short EVolution-Data Optimized. The communications network 200 has a protocol structure and it is layered into a Radio Network Layer (RNL) and a Transport Network Layer (TNL) (not shown). The radio network layer is specified as logical nodes and interfaces between them, together forming a control plane (for control signalling) and user plane (for user data). The transport network layer provides services for user plane transport and signalling transport. In the following, the transport network layer will be referred to as the transport network.

The communications network 200 comprises a first base station 201 serving a cell. The first base station 201 may be a base station such as a NodeB, an eNB, or any other network unit capable to communicate over a radio carrier with a user equipment (not shown) being present in the cell. The user equipment may be any device, mobile or stationary, enabled to communicate over the radio channel in the communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop or PC. Even though FIG. 2 illustrates only one first base station 201 for the sake of simplicity, the skilled person will understand that the communications network 200 may comprise a plurality of first base stations 201.

The first base station 201 comprises a transport network transmission equipment 205. The transport network transmission equipment 205 is embedded in the first base station 201. The transport network transmission equipment 205 may be represented by a router, a switch (e.g. an Ethernet switch) or a SDH/PDH equipment.

Furthermore, the first base station 201 comprises a relay 209 configured to bypass the transport network transmission equipment 205. The relay 209 may be a "power on relay" which may be closed and opened. The relay 209 may be implemented as a galvanic relay, an optical fiber (space-) switch or by multi hop radio. The latter one assumes that the radio may be reconfigured to perform the bypass on radio level. All of the examples allow the fiber, copper and radio to bypass the powered electrical transmission circuits in the first base station 201 that will be powered off during bypass. A relay 209 may be seen as a switch which is electrically operable. When the relay 209 is closed, the transport network transmission equipment 205 is bypassed, and data traffic on a transport network line 211 going through the transport network transmission equipment 205 goes through the relay 209 instead. When the relay 209 is open, the transport network transmission equipment 205 is not bypassed, and data traffic on the transport network line 211 goes through the transport network transmission equipment 205.

The communications network 200 comprises a first network node 215 which is configured to communicate with the first base station 201. In some embodiments, the first network node 215 is comprised in the first base station 201. In some embodiments, the first network node 215 is represented by an Operation and Maintenance (O&M) equipment such as an Operations Support System (OSS), or a Network Operation Center (NOC), or a node located at the Main Unit (MU) site, or another network node, e.g. a control node in the radio network node, such as a Radio Network Controller (RNC) in UMTS.

The communications network 200 further comprises a second network node 217 from which data traffic is transmitted, via the first base station 201, to a third network node 220. The second network node 217 may be represented by for example a second O&M node or a second RNC node or a second base station or any other suitable network node. The third network node 220 may be represented by a third O&M node or a third RNC node or a third base station or any other suitable network node. Even though the second network node 217 and the third network node 220 are seen to be the closest neighboring nodes to the first base station 201, the skilled person will understand that any number of network nodes may be between the first base station 201 and the second network node 217, and that any number of network nodes may be between the first base station 201 and the third network node 220.

It should be noted that the communication links between the entities in the communications network 200 illustrated in FIG. 2 may be of any suitable kind including either a wired or wireless link. The links may use any suitable protocol depending on type and level of layer (e.g. as indicated by the Open Systems Interconnection (OSI) model) as understood by the person skilled in the art.

Figure 1:
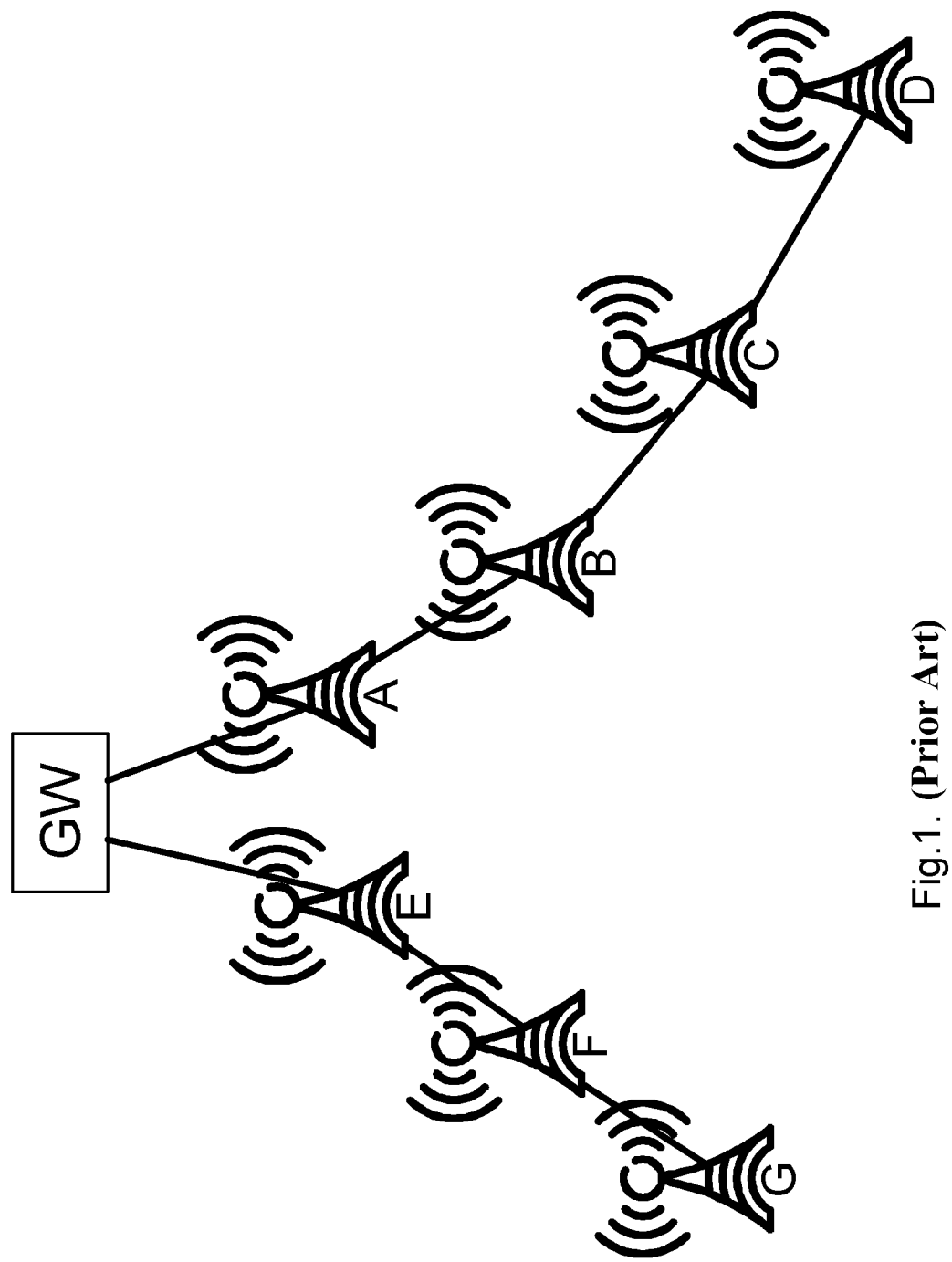
FIG. 1 is a schematic block diagram illustrating embodiments of a communications network comprising cascaded base stations.

Even though the network nodes are referred to as the first network node, the second network node and the third network node, the nodes does not have to be placed in an order according to their numbering, i.e. first, second and third. Any suitable order of the network nodes is applicable, depending on for example the topology of the communications network 200, e.g. a tree or a ring topology. For example, referring to the tree topology exemplified in FIG. 1, the first network node 203 may be represented by any of the cascaded base stations A-G in FIG. 1. This is also valid for the second network node 217, the third network node 220 and the first base station 201.

Figure 3:
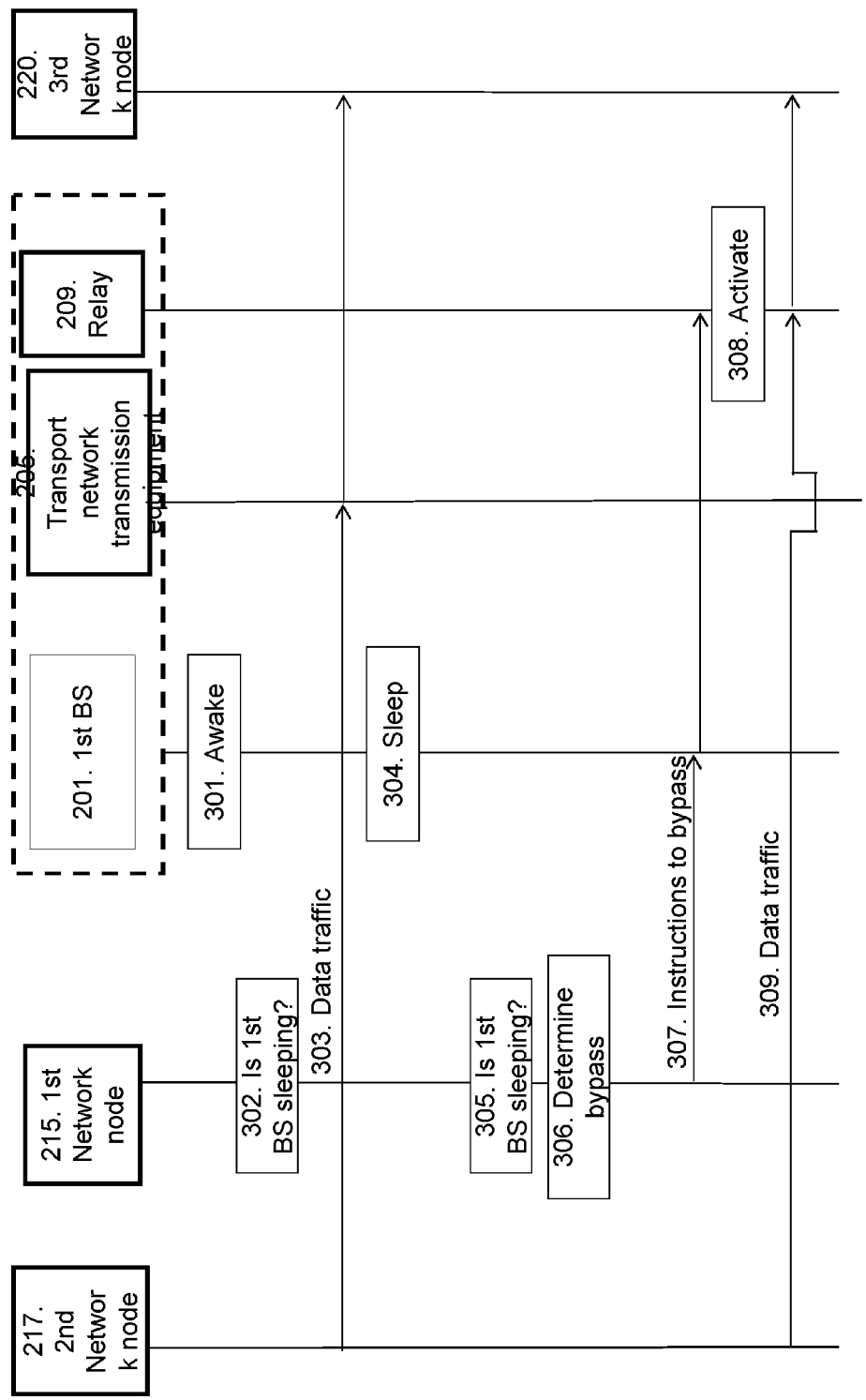
FIG. 3 is a signaling diagram illustrating embodiments of a method in a communications network.
Figure 4:
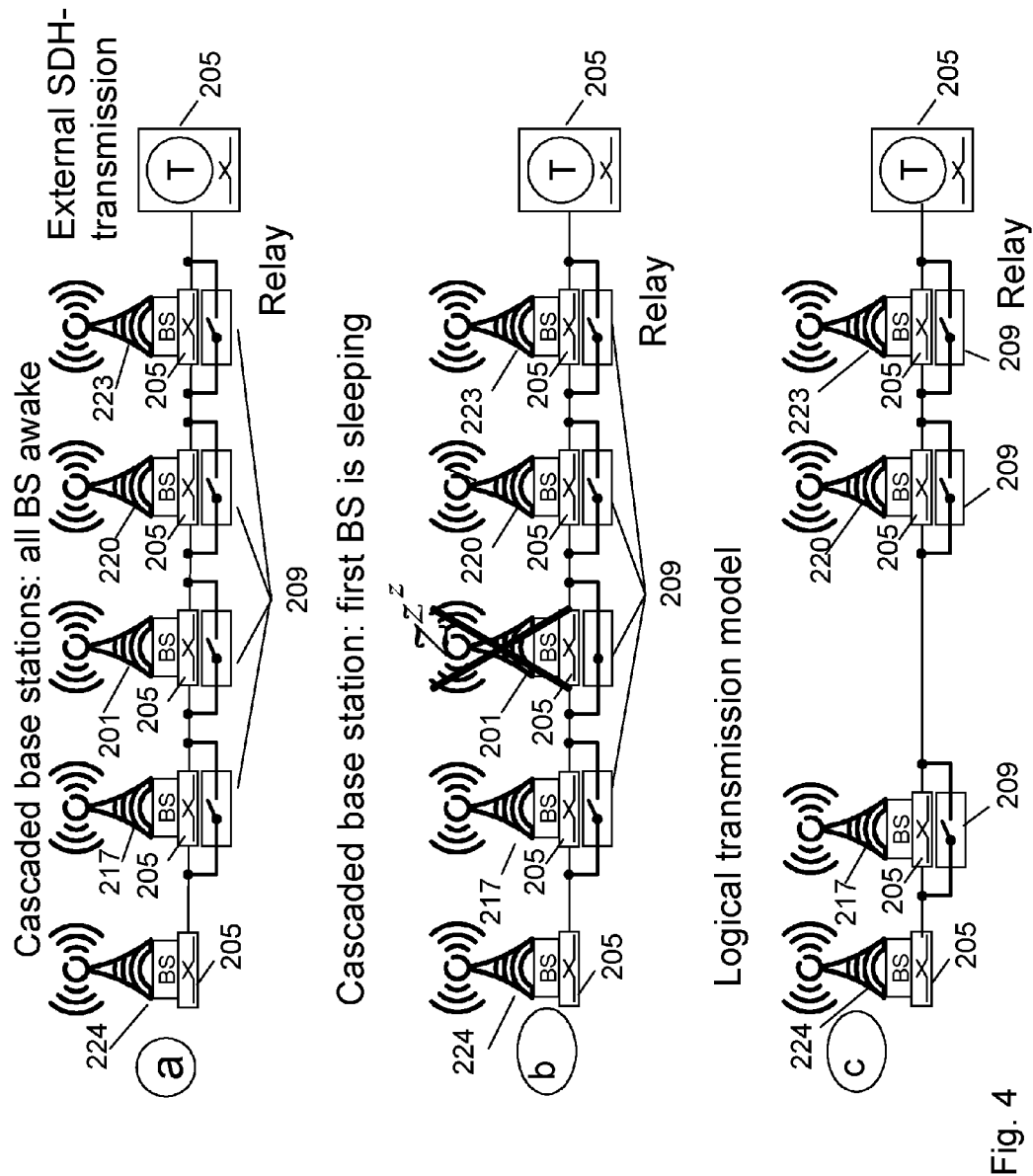
FIG. 4a-c are schematic block diagrams illustrating embodiments of a scenario of the transport network relaying for energy saving.

The method for handling transport network data traffic in the first base station 201 according to some embodiments will now be described with reference to the combined signalling diagram and flowchart depicted in FIG. 3 with reference to FIGS. 4a-c illustrating an a scenario with a plurality of cascaded first base stations 201. In FIG. 4, the box with a circled T represents a transport network equipment, e.g. a router or a switch or SDH/PDH equipment, such as an SDH cross connect. In some embodiments, the transport network equipment is standalone, such as a switch or a router. In some embodiments, the transport network equipment is embedded in another node, for example the first base station 201. In the example in FIG. 4, the second network node 217 is represented by a second base station, the third network node 220 is represented by a third base station. Furthermore, the communications network 200 comprises a fourth base station 223 and a fifth base station 224. The first base station 201, the second base station 217, the third base station 2220 and the fourth base station 223 each comprise a relay 209. The first network node 215 is not illustrated in FIG. 4, but it may be embedded din the first base station 201 or it may be a standalone node. Each base station comprises a transport network transmission equipment 205. The method comprises the following steps, which steps may as well be carried out in another suitable order than described below.

Step 301

The first base station 201 is awake, i.e. the relay 209 is open. This is also illustrated in FIG. 4a, where all base stations 201, 217, 220, 223, 224 are awake.

Step 302

Figure 5:
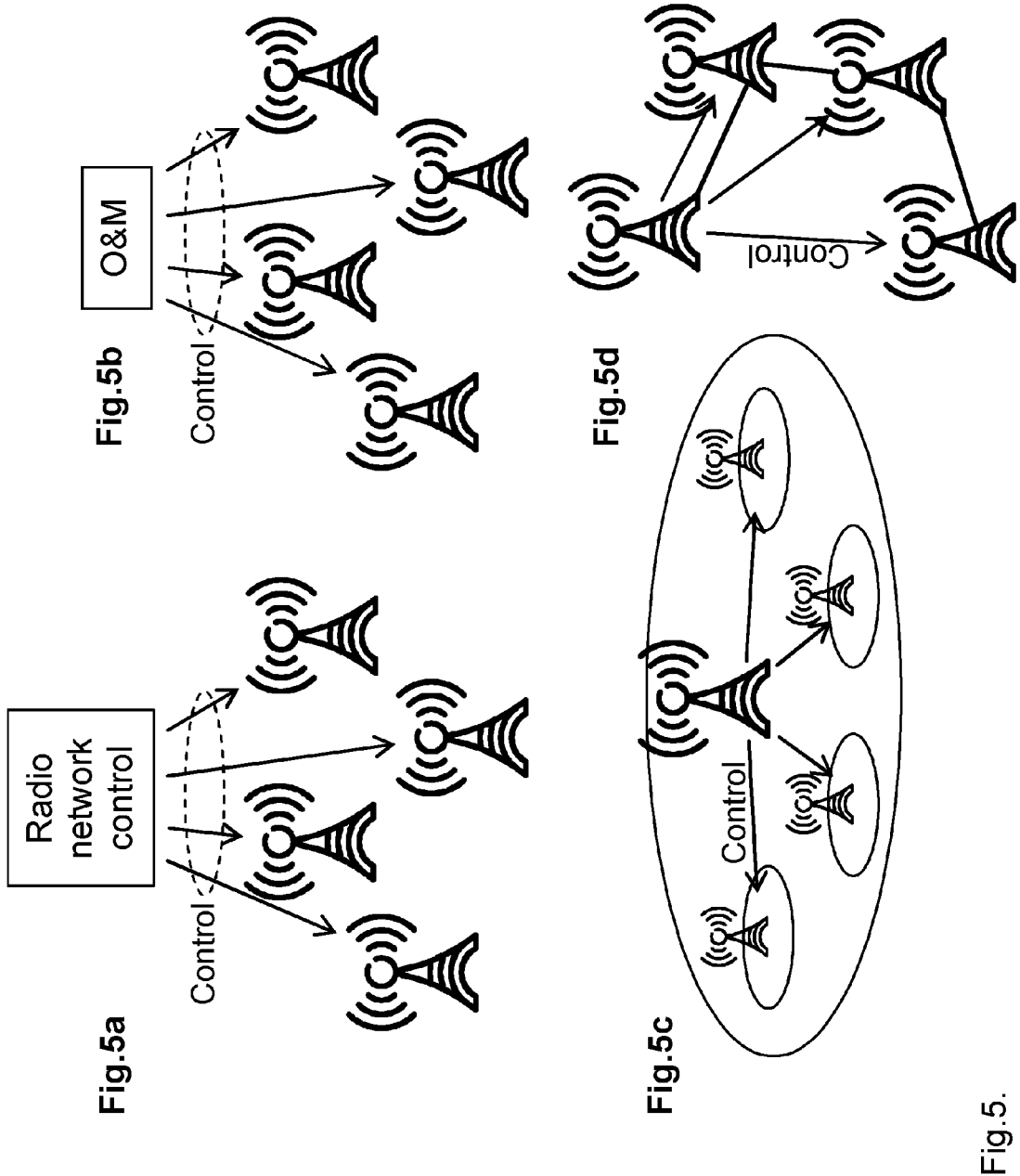
FIG. 5a-d are schematic block diagrams illustrating embodiments of centralized control of sleep mode and relay operation.

The first network node 215 checks if the first base station 201 is sleeping, and determines that the first base station 201 is not asleep, i.e. it is awake. The first network node 215 may determine this by receiving information from the first base station 201 about its status. The first network node 215 may check the sleeping mode in several different ways, such as centralized control i.e. OAM or using built-in monitoring features in routing. A simple detection of a sleeping first base station 201 may be done by sending a ping, i.e. an Internet Control Message Protocol (ICMP) Echo Request, to its Internet Protocol (IP)-host address. The centralized control may be performed by coordinating the power off of the first base station 201 i.e. radio functions. In FIG. 5, these are explained in more detail.

Step 303

When the first base station 201 is awake, data traffic transmitted from the second network node 217 goes via the transport network transmission equipment 205 to the third network node 220.

Step 304

The first base station 201 goes from being awake to being asleep. The sleep mode in the first base station 201 may follow a periodic pattern (or any other time pattern), in which case the sleeping first base station 201 may keep some clock circuitry running to wake up the remainder of the base station 201, or parts thereof, according to the time pattern. The first base station 201 may start sleeping upon instructions from another node, such as e.g. the first network node 215. In some embodiments, the sleep mode may be initiated by using traffic statistics of the nodes and enter sleep mode when traffic according to the statistics is predicted to be beyond a lower limit. The sleep mode may be related to traffic demands over the air interface or detection of a user equipment in the coverage of the specific cell. Many of these actions are part of the radio logic comprised in the first base station 201. The first base station 201 may be sleeping due to that it has lost its power, partially or completely, or due to faults in the power grid and/or the local energy generation/storage. The sleeping first base station 201 may also be referred to as a failing first base station 201 that has lost its power. The first base station 201 may also have been put in sleep mode for the purpose of saving energy.

In FIG. 4, this is illustrated in FIG. 2a, where the middle base station, i.e. the first base station 201, is sleeping. The other base stations 217, 220, 223, 224 are still awake.

Step 305

The first network node 215 checks whether the first base station 201 is sleeping, and determines that the first base station 201 is sleeping. The first network node 215 may determine this by receiving information from the first base station 201 about its status. Other methods for detecting a sleeping base station are described above in conjunction with step 302 and may e.g. include lack of response to a probe message, such as a ping message (i.e. an ICMP Echo Request).

Step 306

Since the first network node 215 has determined that the first base station 201 is sleeping, the first network node 215 determines that the transport network transmission equipment 205 should be bypassed.

Step 307

The first network node 215 transmits instructions to the sleeping first base station 201 about the bypassing. The instructions may be sent directly to the relay 209 or (as illustrated in FIG. 3) to other relay controlling circuitry and logic, which is kept awake in the first base station 201 for the purpose of receiving instructions about closure and opening of the relay.

Step 308

The first base station 201, upon receipt of the instructions, activates the relay 209, i.e. bypassing the transport network transmission equipment 205. The instructions may be received by the relay 209 or (as illustrated in FIG. 3) by other relay controlling circuitry and logic, which is kept awake in the first base station 201 for the purpose of receiving instructions about closure and opening of the relay 209. The relay 209 may be a galvanic relay which shortcuts the physical transmission line 211, such that other base stations may use the transmission line 211, and thus maintain transport network connectivity. The opening and closure of the relay 209 is based on instructions from the (centralized or distributed) radio network control logic, i.e. the first network node 215. The relays 209 are applicable for both copper and fiber. The relay 209 may be implemented as a galvanic relay, an optical fiber (space-) switch or by multi-hop radio. The latter one assumes that the radio may be reconfigured to perform the bypass on the radio level. All of these examples allow the fiber, copper and radio to bypass the powered electrical transmission circuits in the first base station 201 that will be powered off during bypass. The copper is using galvanic relays and the optical relay is a space switch or a relay using a mirror to move the light to another optical fiber.

Step 309

Data traffic sent from the second network node 217 is bypassed around the transport network transmission equipment 205, going through the relay 209, and is received at the third network node 220. This is illustrated in FIG. 4c, showing a logical transmission model, where the data traffic is bypassed through the transport network transmission equipment 205 in the first network node 201.

When the power is lost in the first base station 201, the local battery is empty or the diesel generator is out of fuel, the relay is activated (closed) and the first base station 201 is disconnected from the transport network and the relay 209 bypasses the transmission line 211 such that other cascaded base stations may use the transmission line 211 and thus maintain transport network connectivity. However, the mechanism is only triggered at power failures due to faults in the power grid and/or the local energy generation/storage.

Thus, the embodiments herein leverages the relay 209 and adds a remote control of the relays 209 in the transport network, so that it may be used for the purpose of supporting improved sleep mode in the first base station 201 in energy efficient heterogeneous networks. That is, the relay 209 is closed, bypassing the transport network transmission equipment 205 when the first base station 201 is in sleep mode, thus allowing the sleeping first base station 201 to turn off all or a part of its embedded transport network transmission equipment 205. Thus, well-coordinated management of efficient base station sleep mode is enabled.

From the perspective of a sleeping first base station 201 there are at least two slightly different variants of relay control and sleep mode. As one variant, the first base station 201 sleeps completely and the relay 209 at the sleeping first base station 201 is controllable from the first network node 215, such as another base station, a radio network control node and/or an O&M node. That is, the first network node 215 is not embedded in the first base station 201, i.e. it is a separate node which may send a signal to the relay 209 in the first base station 201 to trigger it to close or open. The first network node 215 may also wake up the first base station 201 through a control signal, e.g. by turning on its power. In this case the first network node 215 directly controls the relay 209 and the sleep mode of the concerned first base station 201.

In the other variant the first network node 215 is embedded in the first base station 201 and they may be seen as one node. In this variant, the first base station 201 sleeps almost completely, but keeps a small control part awake. This control part, i.e. the first network node 215, controls the relay 209 as well as receives wakeup triggers (for complete or partial wakeup) and possibly communicates with other nodes, e.g. other base stations, a radio network control node and/or an O&M node. If the sleeping first base station 201 is able to communicate with other nodes, it may send and/or receive control data to/from other base stations, a radio network control node and/or an O&M node in order to coordinate sleep mode and relay operation and it may also receive a wakeup control signal from another node. For the first base station 201 to be able to communicate with another node, there must be some connectivity to the first base station 201, which in turn means that the relay 209 cannot apply to the entire transport network transmission, but some transmission leading to the sleeping first base station 201 must be left unaffected by the relay 209. In this case another node, such as a base station, a radio network control node or an O&M node may control sleep mode and relay operation indirectly via the sleeping base station. It is also possible that the sleeping first base station 201, at least periodically, monitors a part of the radio spectrum to listen for possible wakeup triggers, e.g. in the form of a control signal from a user equipment. The sleep mode and relay operation may also follow a strict periodic pattern (or other time pattern), in which case the sleeping first base station 201 may keep some clock circuitry running to wake up the remainder of the first base station 201, or parts thereof, according to the time pattern. In the two latter cases the first base station 201 controls its own sleep mode and relay operation, but may inform other base stations of its sleep mode and/or relay related actions or schedule.

The control of the relay 209 should be aligned with the control of sleep mode in the radio network. This control may be centralized or distributed with strict or loose coordination. Hence, in the centralized case the control and coordination of sleep mode (and coordinated coverage extensions when applicable) as well as closing and opening of the relay 209 may be exercised by a central first network node 215, i.e. the first network node 215 and the first base station 201 are separate nodes. The first network node 215 may be a Radio Network Controller (RNC) or a new radio network control node in LTE. An alternative could be that the O&M system, e.g. represented by an OSS, handles this coordination and control. It may also be the case that another base station, e.g. a macro layer base station, is responsible for controlling and coordinating sleep mode and relay operation in lower layer base stations, e.g. pico base stations, within its coverage area. A base station may also control sleep mode and relay operation in base stations based on transport network topology, such that the controlling base station controls the base stations that depend on it for transport network connectivity, such as cascaded base stations further out on the same network branch. The centralized control case is illustrated in FIGS. 5a-d.

In FIG. 5a, the first network node 215 that has the centralized control over the base stations is represented by a radio network control node.

In FIG. 5b, the first network node 215 has the centralized control over the base stations, is represented by an O&M node.

In FIG. 5c, the first network node 215 has the centralized control over the base stations, is represented by another base station, e.g. a macro base station.

In FIG. 5d, the first network node 215 has the centralized control over the base stations, is represented by a base station in the same branch in a tree topology.

Figure 6:
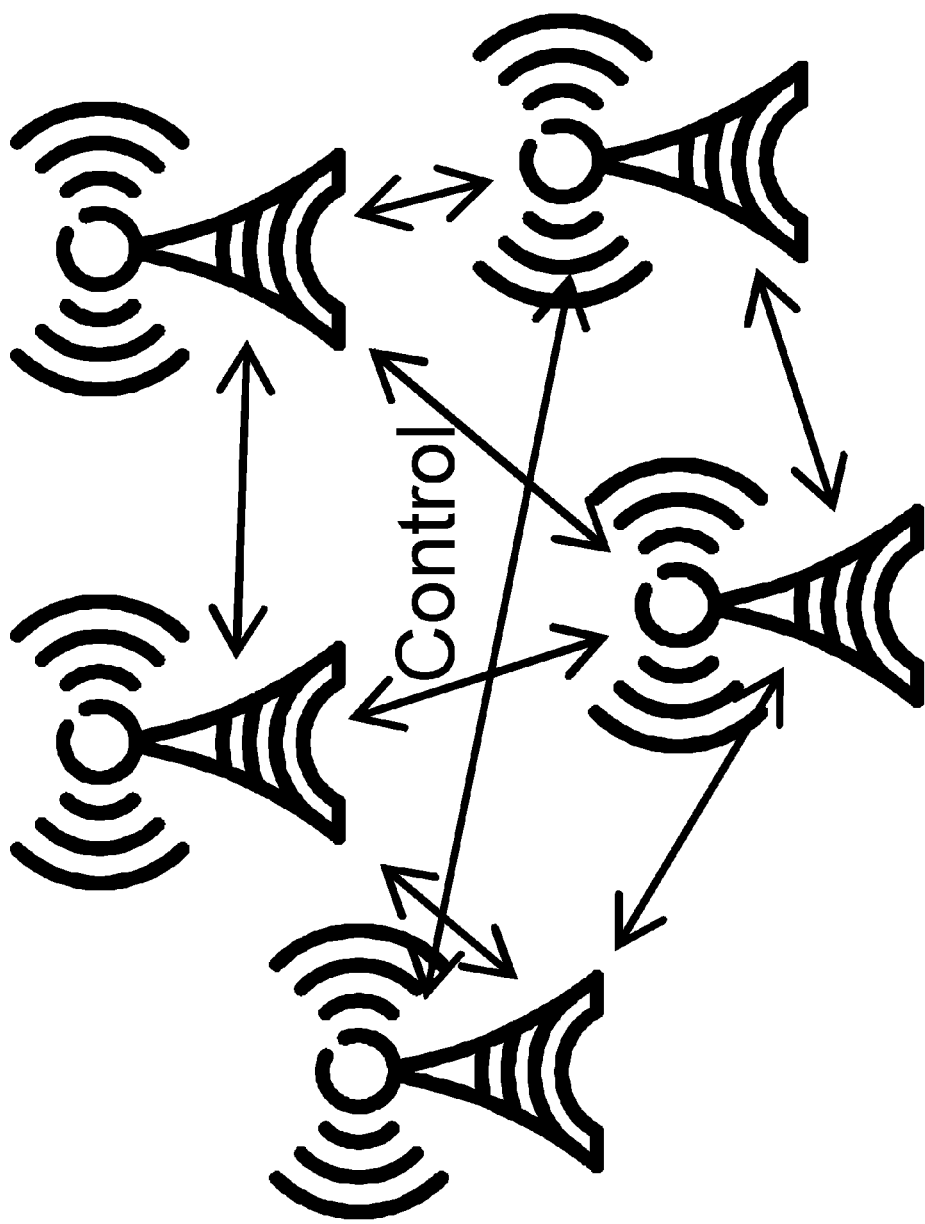
FIG. 6 is a schematic block diagram illustrating embodiments of distributed, strictly coordinated control of sleep mode and relay operation.

In the distributed, strictly coordinated case all base stations in the radio network, or in a suitably sized part of the radio network (e.g. based on transport network topology or radio network topology), may reach each other through a common switched or routed control plane network, such that any base station may control sleep mode and/or the relay operation of any other base station, or such that the base stations may negotiate sleep mode, coverage extension and relay operation with each other in order to converge at a common coordinated schedule. The distributed, strictly coordinated control case is illustrated in FIG. 6.

Figure 7:
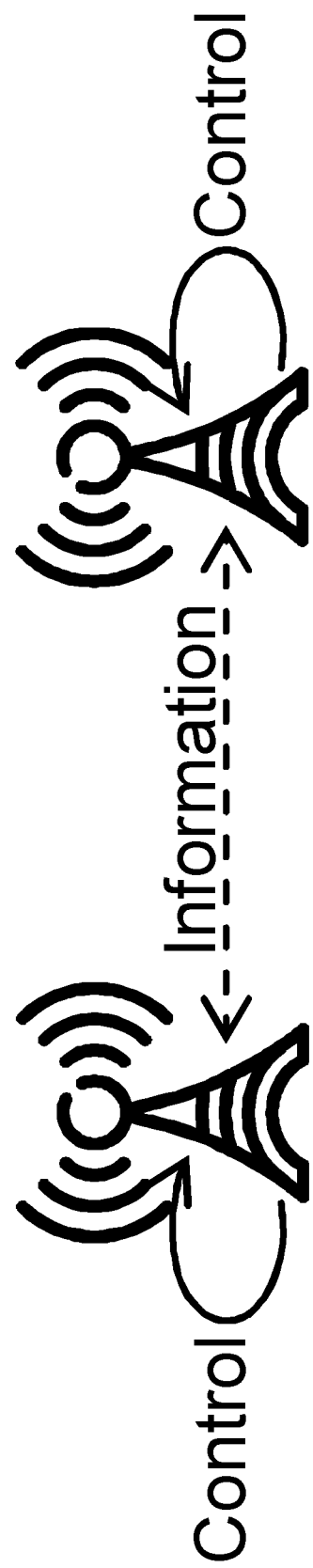
FIG. 7 is a schematic block diagram illustrating embodiments of a distributed, strictly coordinated control of sleep mode and relay operation.

In the distributed, loosely coordinated case each base station autonomously controls its own sleep mode and relay operation and informs neighboring base stations of its actions rather than negotiates with them. The distributed, loosely coordinated control case is illustrated in FIG. 7.

Figure 8:
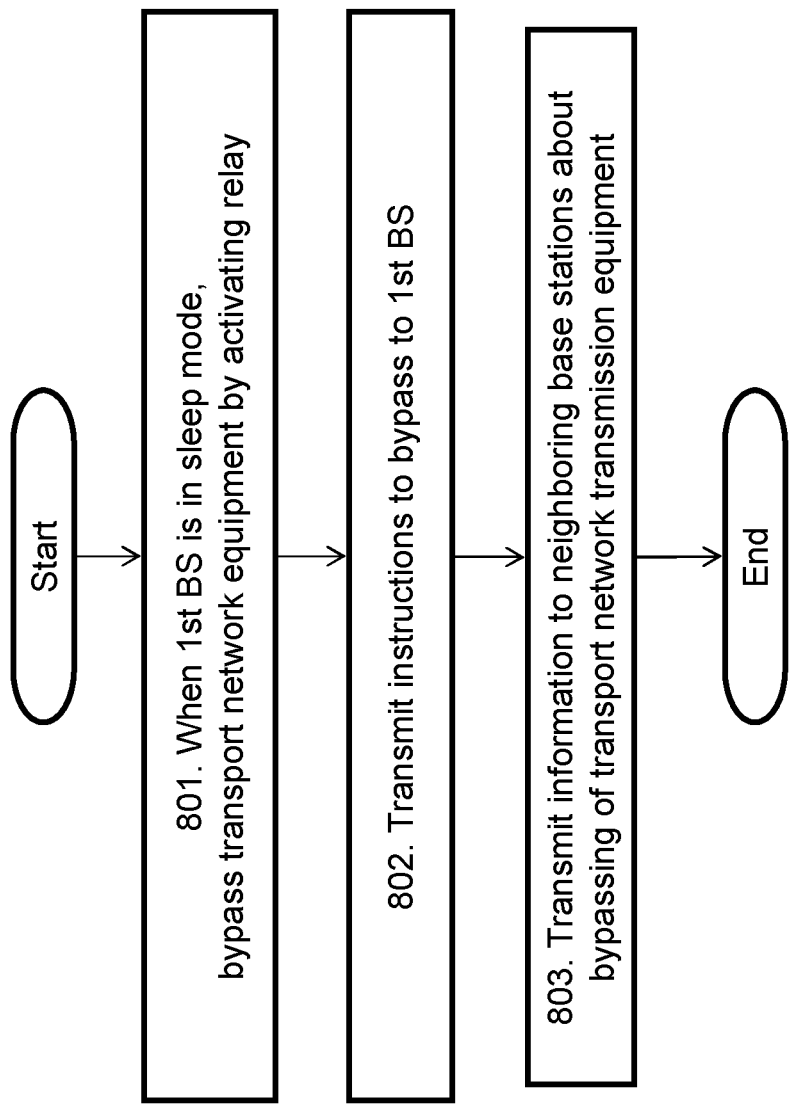
FIG. 8 is a flow chart illustrating embodiments of a method in the first network node.

The method described above will now be described seen from the perspective of the first network node 215. FIG. 8 is a flowchart describing the present method in the first network node 215 for handling transport network data traffic in the first base station 201. The first base station 201 comprises a transport network transmission equipment 205 and the transport network transmission equipment 205 is a part of the transport network. The first network node 215 may be represented by a first O&M node or a first RNC node or the first base station 201. The method comprises the further steps to be performed by the first network node 215, which steps may be performed in any suitable order:

Step 801

This step corresponds to step 306 in FIG. 3.

When the first base station 201 is in a sleep mode, the first network node 215 determines that the transport network transmission equipment 205 should be bypassed by activating a relay 209 comprised in the first base station 201 such that data traffic from a second network node 217 is transmitted via the relay 209 to a third network node 220.

In some embodiments, the first base station 201 is configured to periodically entering the sleep mode and bypassing the transport network transmission equipment 205.

In some embodiments, the first base station 201 is in the sleep mode when the first base station 201 experiences low traffic or a power failure.

The second network node 217 may be represented by a second O&M node or a second RNC node or a second base station and the third network node 220 may be represented by a third O&M node or a third RNC node or a third base station.

Step 802

This step corresponds to step 307 in FIG. 3.

In some embodiments, the first base station 201 transmits instructions to the first base station 201 to bypass the transport network transmission equipment 205.

In some embodiments, the instructions comprise a trigger to trigger the activating of the relay 209. In some embodiments, the instructions comprise a control signal enabling the first network node 215 to directly control the activation of the relay 209. In some embodiments, the instructions further comprise instructions to exit the sleep mode and to enter an awake mode, which awake mode is a complete wakeup mode or a partial wakeup mode. In some embodiments, the instructions are transmitted periodically to the first base station 201.

Step 803

In some embodiments, the first base station 201 transmits information to neighboring base stations about the bypassing of the transport network transmission equipment 205.

Figure 9:
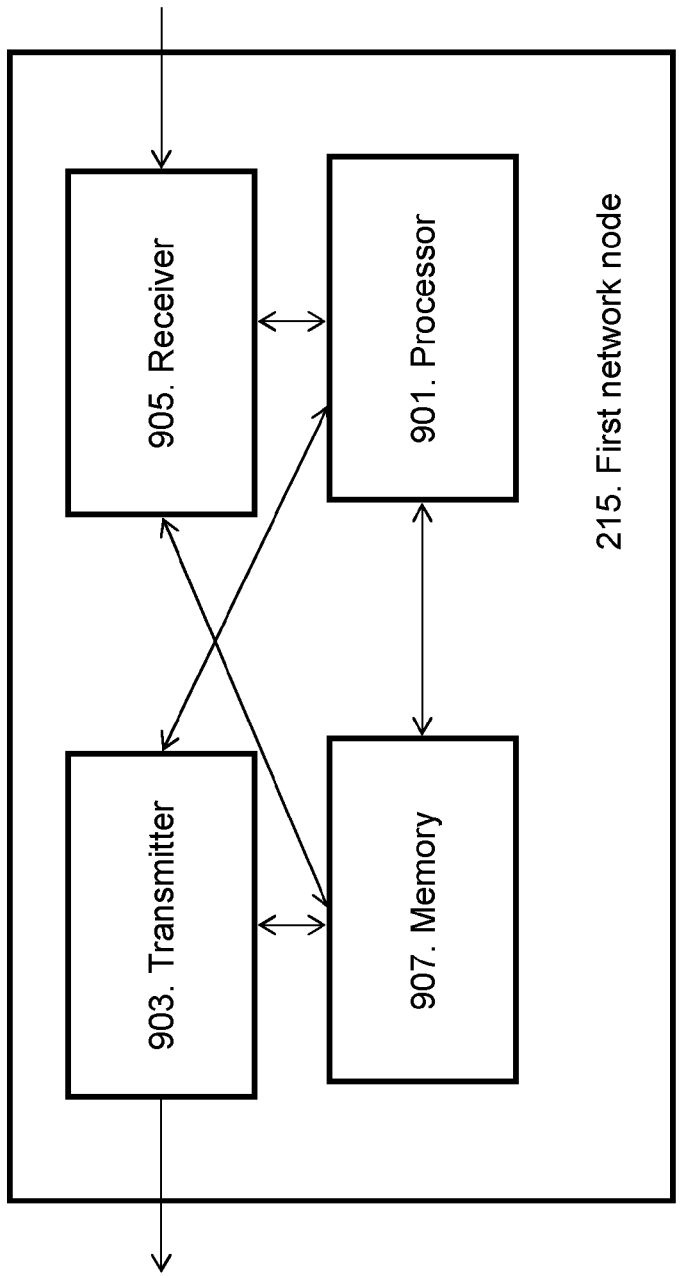
FIG. 9 is a schematic block diagram illustrating embodiments a first network node.

To perform the method steps shown in FIG. 8 for handling transport network data traffic in the first base station 201 the first network node 215 comprises an arrangement as shown in FIG. 9. The first network node 215 may be represented by a first O&M node or a first RNC node or the first base station 201.

The first base station 201 comprises a transport network transmission equipment 205 and the transport network transmission equipment 205 is a part of the transport network. The first network node 215 comprises a processor 901 configured to, when the first base station 201 is in a sleep mode, determine that the transport network transmission equipment 205 should be bypassed by activating a relay 209 comprised in the first base station 201 such that data traffic from a second network node 217 is transmitted via the relay 209 to a third network node 220. The first base station 201 may be configured to periodically entering the sleep mode and bypassing the transport network transmission equipment 205. The first base station 201 may be in the sleep mode when the first base station 201 experiences low traffic or a power failure. The second network node 217 may be represented by a second O&M node or a second RNC node or a second base station and the third network node 220 may be represented by a third O&M node or a third RNC node or a third base station.

The first network node 215 may further comprises a transmitter 903 configured to transmit instructions to the first base station 201 to bypass the transport network transmission equipment 205. The instructions may comprise a trigger to trigger the activating of the relay 209. The instructions may comprise a control signal enabling the first network node 215 to directly control the activation of the relay 209. The instructions may further comprise instructions to exit the sleep mode and to enter an awake mode, which awake mode is a complete wakeup mode or a partial wakeup mode. The transmitter 903 may be is configured to periodically transmit the instructions to the first base station 201. The transmitter 903 may be configured to transmit information to neighboring base stations about the bypassing of the transport network transmission equipment 205.

The first network node 215 may comprise a receiver 905 configured to receive data from the first base station 201, from the second network node 217, from the third network node 230, from other network nodes etc.

The present mechanism for handling transport network data traffic in the first network node 215 may be implemented through one or more processors, such as the processor 901 in the first network node arrangement depicted in FIG. 9, together with computer program code for performing the functions of the embodiments herein. The processor may be for example a Digital Signal Processor (DSP), Application Specific Integrated Circuit (ASIC) processor, Field Programmable Gate Array (FPGA) processor or microprocessor. The program code mentioned above may also be provided as a computer program product, for instance in the form of a data carrier carrying computer program code for performing the embodiments herein when being loaded into the first network node 215. One such carrier may be in the form of a CD ROM disc. It is however feasible with other data carriers such as a memory stick. The computer program code may furthermore be provided as pure program code on a server and downloaded to the first network node 215.

The first network node 215 may further comprise a memory 907 comprising one or more memory units. The memory 907 is arranged to be used to store data, received data streams, power level measurements, data traffic load, instructions to the first base station 201, first threshold, second threshold, bit rate, time periods, configurations, schedulings, and applications to perform the methods herein when being executed in the first network node 215.

Those skilled in the art will also appreciate that the receiver 905 and the transmitter 903 described above may refer to a combination of analog and digital circuits, and/or one or more processors configured with software and/or firmware, e.g. stored in the memory 907, that when executed by the one or more processors such as the processor 901 perform as described above. One or more of these processors, as well as the other digital hardware, may be included in a single Application Specific Integrated Circuit (ASIC), or several processors and various digital hardware may be distributed among several separate components, whether individually packaged or assembled into a System-on-a-Chip (SoC).

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods defined in the appended claims may, without departing from the embodiments herein, be performed in another order than the order in which they appear in the claims.

The invention claimed is:

1. A method in a first network node for handling transport network data traffic in a first base station, which first base station comprises a transport network transmission equipment and which transport network transmission equipment is a part of a transport network, the method comprising:
when the first base station is in a sleep mode, determining that the transport network transmission equipment should be bypassed by activation of a relay comprised in the first base station such that data traffic from a second network node is transmitted via the relay to a third network node; and
transmitting information to neighboring base stations about the bypassing of the transport network transmission equipment.

2. The method of claim 1, further comprising transmitting instructions to the first base station to bypass the transport network transmission equipment.

3. The method of claim 2, wherein the instructions comprise a trigger to trigger the activation of the relay.

4. The method of claim 2, wherein the instructions comprise a control signal enabling the first network node to directly control the activation of the relay.

5. The method of claim 2, wherein the instructions further comprise instructions to exit the sleep mode and to enter an awake mode, which awake mode is a complete wakeup mode or a partial wakeup mode.

6. The method of claim 2, wherein the instructions are transmitted periodically to the first base station.

7. The method of claim 1, wherein the first base station is configured to periodically enter the sleep mode and bypass the transport network transmission equipment.

8. The method of claim 1, wherein the first base station is in the sleep mode when the first base station experiences low traffic or a power failure.

9. A first network node for handling transport network data traffic in a first base station, which first base station comprises a transport network transmission equipment and which transport network transmission equipment is a part of a transport network, the first network node comprising:
- a processor configured to, when the first base station is in a sleep mode, determine that the transport network transmission equipment should be bypassed by activation of a relay comprised in the first base station such that data traffic from a second network node is transmitted via the relay to a third network node; and
- a transmitter configured to transmit information to neighboring base stations about the bypassing of the transport network transmission equipment.

10. The first network node of claim 9, wherein the transmitter is configured to transmit instructions to the first base station to bypass the transport network transmission equipment.

11. The first network node of claim 10, wherein the instructions comprise a trigger to trigger the activation of the relay.

12. The first network node of claim 10, wherein the instructions comprise a control signal enabling the first network node to directly control the activation of the relay.

13. The first network node of claim 10, wherein the instructions further comprise instructions to exit the sleep mode and to enter an awake mode, which awake mode is a complete wakeup mode or a partial wakeup mode.

14. The first network node of claim 10, wherein the transmitter is configured to periodically transmit the instructions to the first base station.

15. The first network node of claim 9, wherein the first base station is configured to periodically enter the sleep mode and bypass the transport network transmission equipment.

16. The first network node of claim 9, wherein the first base station is in the sleep mode when the first base station experiences low traffic or a power failure.

17. The first network node of claim 9, wherein the first network node is represented by a first Operation and Management (O&M) node or a first Radio Network Control (RNC) node or the first base station.

18. The first network node of claim 17, wherein the second network node is represented by a second Operation and Management (O&M) node or a second Radio Network Control (RNC) node or a second base station and wherein the third network node is represented by a third Operation and Management (O&M) node or a third Radio Network Control (RNC) node or a third base station.

* * * * *